(No Model.)
A. S. KROTZ.
FILTER.
No. 579,154. Patented Mar. 23, 1897.
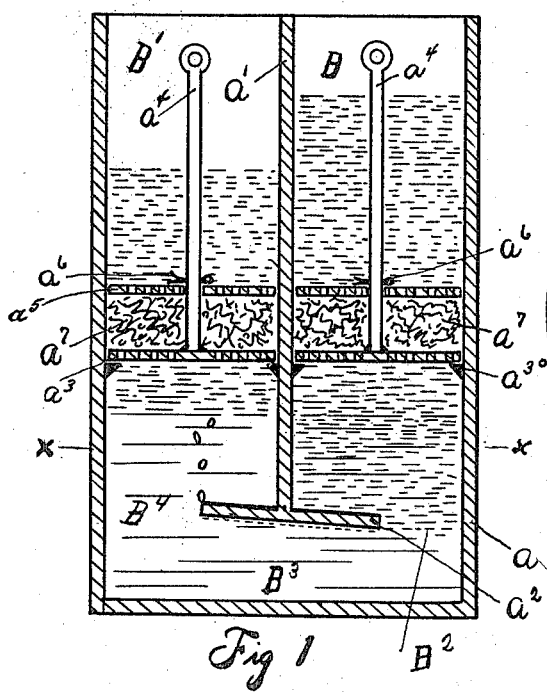
Fig 1.
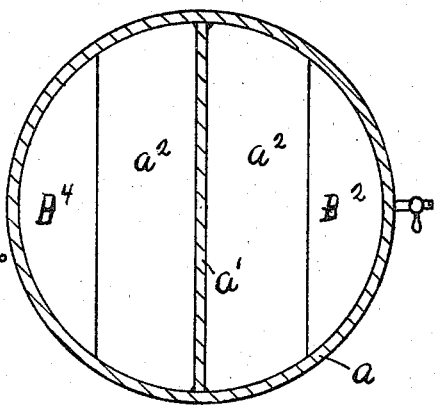
Fig 2.
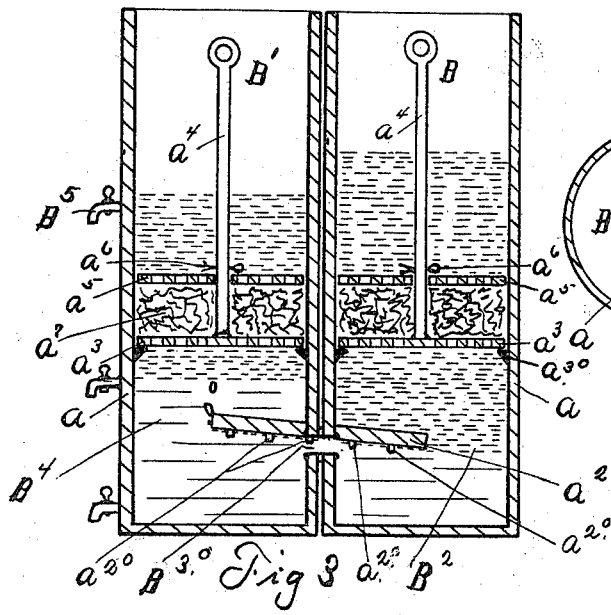
Fig 3.
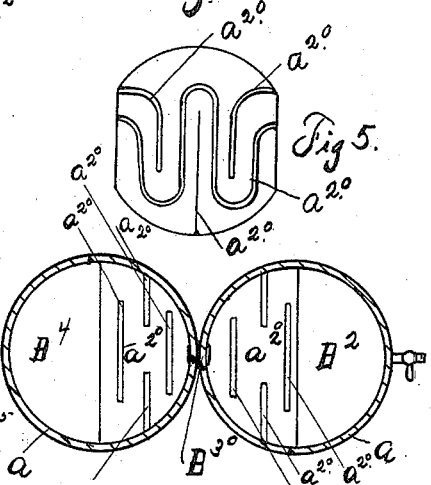
Fig 4.
Fig 5.
Witnesses
Elmer E. Kingma
Frank Rightmyer
Inventor
Alvaro S. Krotz

UNITED STATES PATENT OFFICE.

ALVARO S. KROTZ, OF SPRINGFIELD, OHIO.

FILTER.

SPECIFICATION forming part of Letters Patent No. 579,154, dated March 23, 1897.

Application filed June 3, 1896. Serial No. 594,097. (No model.)

*To all whom it may concern:*

Be it known that I, ALVARO S. KROTZ, a citizen of the United States, residing at Springfield, in the county of Clark and State of Ohio, have invented certain new and useful Improvements in Filters, of which the following is a specification.

My invention relates to improvements in oil-filters.

The object I have in view is to produce a filter which will be successful in spite of unskilled treatment. I accomplish this result by making a filter of two vertical chambers with a communication having a wide upper surface below and placing within each chamber a removable filtering-partition and by filling both chambers above the communicating-plate with pure water.

Figure 1 is a sectional view; Fig. 2, a cross-sectional view on the line $x\,x$ of Fig. 1. Figs. 3 and 4 are modifications of Fig. 1; and Fig. 5 is a bottom view of plate $a^2$ in Figs. 1 and 2, showing position of ridges.

In Fig. 1, $a$ is the chamber or walls of the apparatus. $a'$ is a division-wall which extends from a point near the bottom of the tank to the top. On the bottom of this division-wall is a cross partition-wall $a^2$, extending on an angle, as shown in Fig. 2, and leaving openings $B^2\,B^3\,B^4$.

In the modified form communication is made between the two chambers by means of a short pipe or hose $B^{30}$.

Within the two chambers B B' is a perforated plate $a^3$, with a standard $a^4$, the plate $a^3$ resting on lugs $a^{30}$. Slidingly mounted on stem $a^4$ is a perforated plate $a^5$. Between the plates $a^3$ and $a^5$ is placed a filtering material $a^7$, which is held in a compressed state by means of a pin $a^6$. This built-up partition can readily be removed by means of the stem $a^4$ and the filtering material replaced without disturbing or draining the chambers.

In operation the chambers are filled with water until the partition $a^2$ is submerged in water, and then the unfiltered oil is poured into chamber B, passing down and through the filtering material and crowding the water into chamber B' until the oil reaches below the plate $a^2$. It then flows under the plate and into the chamber B', passing up through the water and filtering material. Thus as B is filled the oil flows around to B' in proportion as B' is drained, for which purpose a cock $B^5$ is provided. The partition-wall $a'$ can extend to the bottom and have perforations for the passage of the oil. When plates $a^2$ are used, the perforations being located below the same, preferably upon the bottom of the plate $a^2$, I place downwardly-projecting strips $a^{20}$, arranged in such a manner as to lengthen the travel of the oil under the plate. This can either be accomplished by short strips $a^{20}$, placed in alternate positions, as shown in Fig. 4, or curved strips $a^{20}$ can be used, as shown in Fig. 5.

Having described my invention, what I claim as new, and desire to secure by Letters Patent, is—

1. In a filter the combination with two vertical chambers a communication near the bottom and between said chambers and a filtering-partition placed within the chambers and above said openings, and a cross wall or plate located near to and above said communication and placed on an oblique angle, and an opening between the outer edge of said cross-wall and the wall of the apparatus.

2. In a filter the combination with the wall or walls separating the tanks, of an inclined plate provided with downwardly-projecting ribs or strips between or around which the oil is forced to travel by said plate being subjected to a water-pressure from below.

In testimony whereof I have hereunto set my hand this 25th day of May, A. D. 1896.

ALVARO S. KROTZ.

Witnesses:
ELMER E. KUQUA,
FRANK RIGHTMYER.